United States Patent Office 3,175,879
Patented Mar. 30, 1965

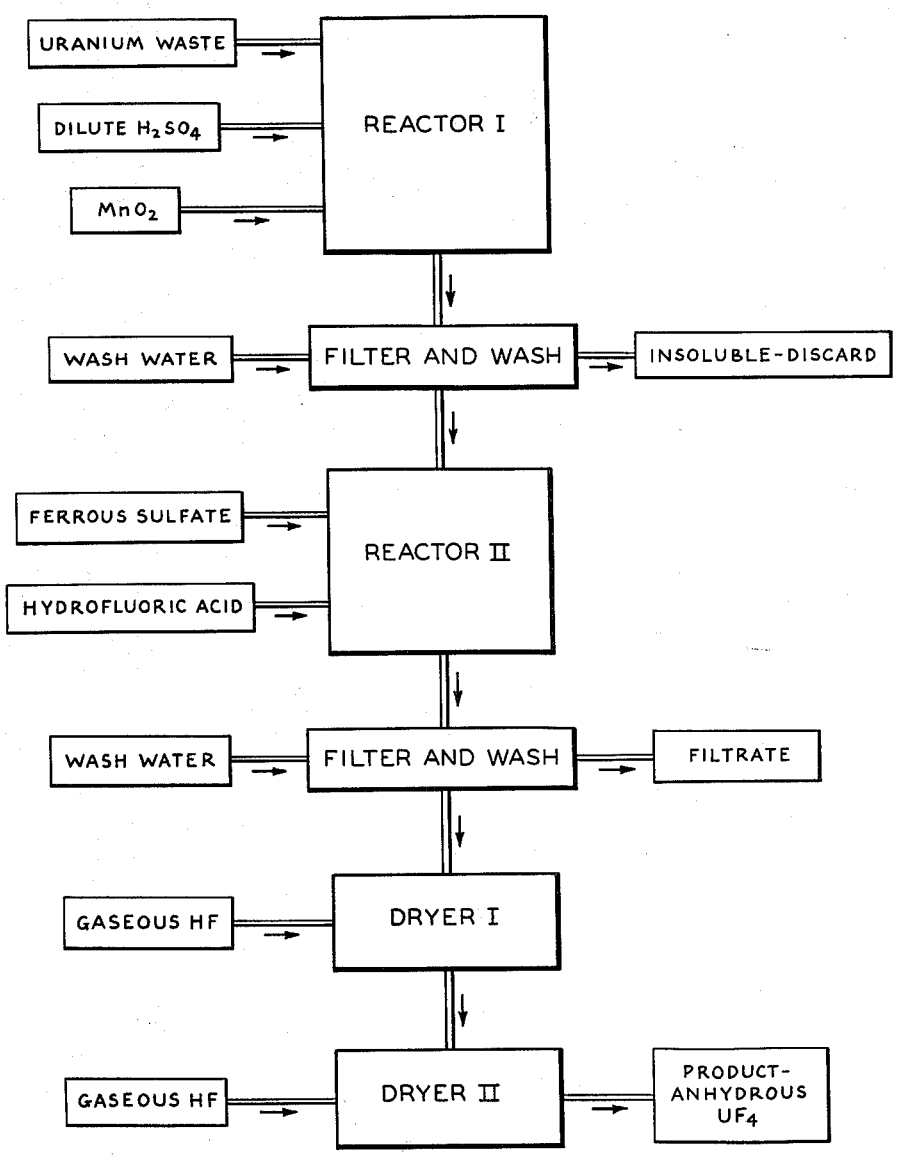

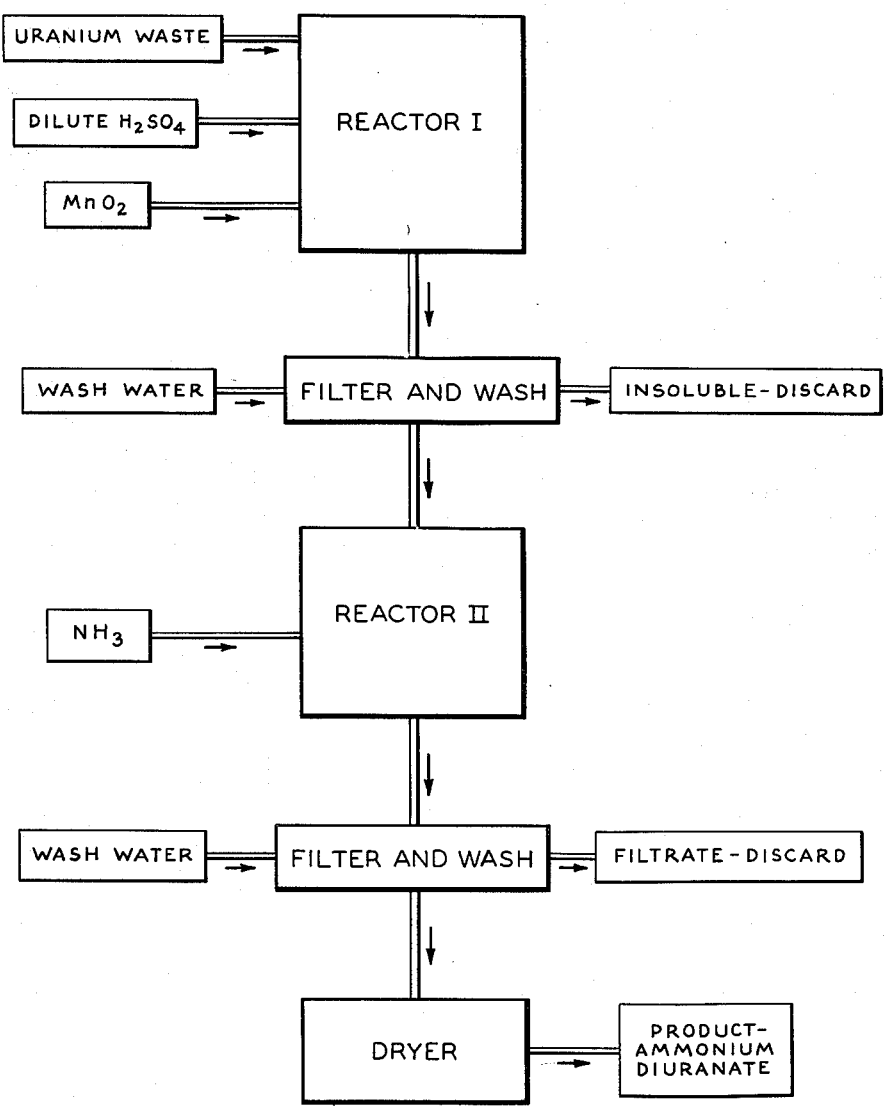

3,175,879
TREATMENT OF BY-PRODUCT URANIUM MATERIAL TO RECOVER PURIFIED CONCENTRATED URANIUM VALUES
Robert V. Townend, Morris Township, Morris County, and John E. Wilkalis, Morris Plains, N.J., assignors to Allied Chemical Corporation, New York, N.Y., a corporation of New York
Filed July 8, 1960, Ser. No. 41,524
2 Claims. (Cl. 23—14.5)

This invention relates to the recovery of uranium values from residues and more particularly refers to a new and improved method of separating uranium values in purified concentrated form from waste material containing a mixture of uranium oxides and other impurities including vanadium and molybdenum materials.

In the production of uranium hexafluoride, ore concentrate ($U_3O_8$), is reduced to uranium dioxide with dissociated ammonia in a fluidized bed reactor as exemplified by the following equation:

$$U_3O_{8(s)} + 2H_{2(g)} \rightarrow 3UO_{2(s)} + 2H_2O_{(g)}$$

The resultant uranium dioxide is hydrofluorinated to uranium tetrafluoride with hydrogen fluoride in a fluidized bed reactor as illustrated below:

$$UO_{2(s)} + 4HF_{(g)} \rightleftharpoons UF_{4(s)} + 2H_2O_{(g)}$$

The uranium tetrafluoride is fluorinated to uranium hexafluoride with fluorine in a fluidized bed reactor as follows;

$$UF_{4(s)} + F_{2(g)} \rightarrow UF_{6(g)}$$

Uranium hexafluoride is subjected to distillation and other treatment to produce very pure uranium hexafluoride as an end product. As will be appreciated in the processing of uranium concentrate to produce uranium hexafluoride small quantities of materials termed by-products or waste inevitably result from such sources as sweepings, traps, filters, etc. Although these by-products are relatively small in amount compared to the concentrate product, nevertheless they are important in that they represent loss of a very valuable material and perhaps even more important they present a pollution problem. The need for recovering uranium value from by-products is obvious but the problem is complicated by the desirability of separating the uranium values in a purified, concentrated form suitable for return to the plant and conversion into additional uranium hexafluoride. Also, since the by-product is a waste material small in amount, the recovery of the uranium values should be accomplished in an efficient, economical manner so as not to place an undue cost burden on the plant operation.

One object of the present invention is to provide an efficient, economical method for the separation of uranium values from uranium waste materials.

Another object is to provide a method for the recovery of uranium values in purified concentrated form suitable for further conversion into uranium hexafluoride from uranium waste materials.

A further object of the present invention is to provide a method for treating uranium waste materials containing a mixture of uranium oxides and vanadium and molybdenum compounds as impurities to separate therefrom values substantially free of impurities.

Other objects and advantages of the present invention will be apparent from the following description and accompanying drawing.

In accordance with the present invention uranium wastes containing insoluble uranium compounds such as $UO_2$, $UO_3$ and $U_3O_8$ are reacted with a dilute sulfuric acid below about 50% concentration preferably within the range of 15–25% concentration, in an amount in excess of that required to react with all the uranium in the waste, together with sufficient manganese dioxide to convert all tetravalent uranium to hexavalent uranium at a temperature within the range of 50 to 130° C., preferably 90–100° C. to form soluble uranyl sulfate $UO_3SO_4$, separating the insoluble materials from the solution containing dissolved uranyl sulfate and free sulfuric acid, adding ferrous sulfate in an amount equal to at least 2 mols of ferrous sulfate per mol of uranyl sulfate together with an excess of hydrofluoric acid at a temperature between 20–100° C., preferably 85 to 100° C. to react the uranyl sulfate with the ferrous sulfate and hydrofluoric acid to precipitate uranium tetrafluoride hydrate and form soluble ferric sulfate, separating the uranium tetrafluoride hydrate from the reaction mixture, drying the uranium tetrafluoride hydrate under an atmosphere of gaseous hydrogen fluoride at a temperature of 100 to 200° C. preferably about 150° C., and converting the dried uranium tetrafluoride hydrate to anhydrous uranium tetrafluoride by heating at a temperature of 300 to 600° C., preferably 475 to 525° C. under an atmosphere of gaseous hydrogen fluoride. Conversion of the hydrate to the anhydrous form may be accomplished in an inert gaseous atmosphere at temperatures not above 400° C.

In an alternative method of operation, to the solution containing dissolved uranyl sulfate produced as above, is added a sufficient excess of ammonia to give a pH of at least 6.5 and react at a temperature of 20–100° C., preferably 60–80° C. with the uranyl sulfate to form insoluble ammonium diuranate precipitate and soluble ammonium sulfate. The ammonium diuranate precipitate is separated from the reaction mixture and dried at a temperature of 100–150° C. preferably 100–120° C. In this modification the uranium values are recovered as $$(NH_4)_2U_2O_7$$

As previously mentioned, waste uranium materials usually contain a mixture of $UO_3$, $U_3O_8$, and $UO_2$ and in addition, vanadium and molybdenum compounds as impurities. Now, $UO_3$ will readily react with sulfuric acid but $UO_2$ will not and $U_3O_8$ only partially. Therefore, it is necessary in order to recover all the uranium values to set up conditions which will permit conversion of the $UO_2$ and $U_3O_8$ to uranyl sulfate. Typical reactions illustrating the present invention are:

$$UO_3 + H_2SO_4 \rightarrow UO_2SO_4 + H_2O$$
$$MnO_2 + U_3O_8 + 4H_2SO_4 \rightarrow 3UO_2SO_4 + 4H_2O + MnSO_4$$
$$MnO_2 + UO_2 + 2H_2SO_4 \rightarrow MnSO_4 + 2H_2O + UO_2SO_4$$

In the second stage reaction wherein the uranyl sulfate is treated with ferrous sulfate and hydrofluoric acid the process is represented by the following equation:

$$UO_2SO_4 + 2FeSO_4 + 10HF + H_2O \rightarrow$$
$$UF_4 \cdot xH_2O + Fe_2(SO_4)_3 + 6HF$$

The $UF_4$ precipitates as a hydrate, $UF_4 \cdot xH_2O$. Vanadium and molybdenum remain in solution.

In the procedure of recovering uranium values as ammonium diuranate, the uranyl sulfate in solution is treated with ammonia in accordance with $$6NH_3 + 2UO_2SO_4 + 3H_2O \rightarrow (NH_4)_2U_2O_7 + 2(NH_4)_2SO_4$$

in which case the uranium values precipitate as $$(NH_4)_2U_2O_7$$

FIGURE I is a flow sheet illustrating one method of carrying out the present invention.

FIGURE II is a flow sheet illustrating an alternative method of operation.

In FIGURE I as illustrated in the drawing uranium wastes containing $UO_2$, $UO_3$, $U_3O_8$ and vanadium and molybdenum impurities together with dilute aqueous sulfuric acid and manganese dioxide are introduced into a reactor wherein the mixture is caused to react by heating to a temperature, preferably of about 90–100° C. for a period of 30 minutes to 4 hours, preferably 1 hour to 2 hours until all the uranium values in the waste are converted to uranyl sulfate. The resultant reaction mixture is an aqueous solution of uranyl sulfate, manganese sulfate, soluble vanadium and molybdenum compounds and insoluble waste material. The contents of the reactor are pumped to a filter where the insoluble portion is separated as filter cake and washed with water to remove occluded uranyl sulfate. The insoluble material in the form of filter cake containing no or negligible amount of uranium is discarded. The filtrate containing dissolved uranyl sulfate, $UO_2SO_4$, is treated with ferrous sulfate and an excess of at least 100% of hydrofluoric acid at a temperature preferably of about 85–100° C. in reactor II to precipitate $UF_4 \cdot xH_2O$. Ordinarily the digestion in reactor II will be complete in a period of 30 to 90 minutes. The precipitation of uranium tetrafluoride hydrate is selective in that it is substantially free of impurities, the vanadium and molybdenum compounds remaining in solution.

$UF_4^-$ hydrate is filtered out and the filter cake washed with water. This filtrate contained little or no uranium values, had an appreciable amount of HF. The hydrogen fluoride in the filtrate may be readily recovered by fractionation or in part together with additional hydrofluoric acid recirculated to reactor II for further reaction with uranyl sulfate.

The washed uranium tetrafluoride hydrate is dried in drier I at a temperature preferably at about 150° C. to remove most of the water although the product does contain some water of hydration. During the drying operation, a stream of HF vapor is circulated throughout the drier in order to prevent the hydrolysis of $UF_4$ to $UO_2$. Ordinarily, adequate drying of the hydrate will be complete in a period of 2 to 3 hours.

The dried uranium tetrafluoride hydrate is then subjected to a second drying in drier II at an elevated temperature preferably about 475 to 525° C. to convert the hydrate to anhydrous uranium tetrafluoride. Gaseous HF vapor is circulated through drier II to prevent hydrolysis. The time required to produce anhydrous uranium tetrafluoride under these conditions is usually about 2 to 3 hours. The product, substantially pure uranium tetrafluoride, is eminently suitable for conversion into uranium hexafluoride.

In FIGURE 2 the operation up to the point of reactor II into which the filtrate containing dissolved uranyl sulfate is introduced is the same as described in FIGURE 1. To the filtrate containing dissolved uranyl sulfate in reactor II is added ammonia in an amount sufficient to react with the uranyl sulfate and produce as a precipitate ammonium diuranate. An adequate amount of ammonia is assured when sufficient ammonia is added until the mixture has a pH of at least 6.5. The mixture is digested at a temperature preferably of about 60–80° C. for a period of about ½ to 2 hours to complete the reaction. The reaction products from reactor II are filtered and washed with water. The filtrate substantially free from uranium values is discarded. The wet ammonium diuranate filter cake containing about 60% moisture is then dried at a temperature preferably at about 100–150° C. to remove the water. The resultant product, dried ammonium diuranate, is substantially free of impurities and suitable for conversion into uranium hexafluoride.

The following examples in which parts are by weight and temperatures are in degrees centigrade unless otherwise stated illustrate the present invention.

*Example 1*

100 parts of uranium waste containing 16.3% $UO_2$, 40.4% $UO_3$, which may be partly combined as $U_3O_8$, 0.5% V, .04% Mo together with 141 parts of 20% $H_2SO_4$ and 5.75 parts $MnO_2$ were reacted by heating in a reaction vessel at a temperature of 85° and digested at that temperature for a period of about 1½ hours. The resultant reaction mixture was filtered and the filter cake washed with 30 parts of water. The insoluble material, i.e., the filter cake in amount of 21 parts dry basis was discarded. This insoluble material showed by analysis that it contained a negligible amount of uranium—0.013% uranium based on the total uranium in the uranium waste charging material. 250.75 parts filtrate were then introduced into a second reactor to which was added 251.3 parts of a solution of ferrous sulfate having a concentration of 26.8%, and 184 parts of aqueous hydrofluoric acid having a concentration of 24%, the amount of hydrofluoric acid being 150% in excess of that required to react with uranyl sulfate and the mixture was maintained at a temperature of about 90° C. and allowed to stand at that temperature for 1 hour to effect substantially complete precipitation of uranium tetrafluoride hydrate. The resultant reaction mixture was filtered and washed with water to separate the uranium tetrafluoride hydrate precipitate. The filtrate contained less than 0.1% uranium based on the uranium charged to the system. The wet uranium tetrafluoride hydrate filter cake was dried in a drier through which gaseous hydrogen fluoride was circulated until free water was removed and the hydrate was reduced to 66.2 parts. The dried uranium tetrafluoride hydrate was then subjected to a second drier at a temperature of 500° through which HF was also circulated until anhydrous uranium tetrafluoride was produced. The resultant product 63.4 parts was about 99% purity and constituted a recovery of uranium values based on the uranium in the waste of over 99.9%.

*Example 2*

The filtrate containing dissolved uranyl sulfate was prepared in the same manner as in Example 1. To 250.75 parts of this filtrate was introduced 10 parts of $NH_3$, the resultant mixture having a pH above 6.5. This mixture was digested for 1 hour at 80° causing reaction and precipitation of ammonia diuranate. The reaction mixture was then filtered and washed with 60 parts water. The filtrate containing less than 0.1% uranium values based on the original uranium treated was discarded. The wet ammonium diuranate filter cake containing about 65% moisture was dried in a drier at 110° for a period of 3 hours. The resultant product was dried ammonium diuranate and constituted a recovery of uranium values of better than 99% based on the uranium in the charge.

Although certain preferred embodiments of the invention have been disclosed for purpose of illustration, it will be evident that various changes and modifications may be made therein without departing from the scope and spirit of the invention.

We claim:

1. A process for the recovery of uranium values in purified concentrated form from uranium wastes containing uranium oxides which comprises admixing with said uranium waste a dilute sulfuric acid having a concentration below 50% $H_2SO_4$ in an amount at least sufficient to react with all the uranium in the waste together with sufficient manganese dioxide to convert all tetravalent uranium to hexavalent uranium, heating said mixture at a temperature within the range of 50 to 130° C. to form soluble uranyl sulfate, $UO_2SO_4$, separating the insoluble materials from the solution containing dissolved uranyl sulfate, adding ferrous sulfate to the solution containing dissolved uranyl sulfate in an amount equal to at least 2 mols of ferrous sulfate per mol of uranyl sulfate, adding to the solution containing dissolved uranyl sulfate, hydrofluoric acid in an amount at least 100% in excess of that required to react with the uranyl sulfate, maintaining the mixture of uranyl sulfate, ferrous sulfate and hydrofluoric acid at a temperature between 85–100° C.

to precipitate uranium tetrafluoride hydrate and separating the uranium tetrafluoride hydrate precipitate from the reaction mixture.

2. A process for the recovery of uranium values in purified concentrated form from uranium wastes containing uranium oxides which comprises admixing with said uranium waste a dilute sulfuric acid having a concentration within the range of 15–25% $H_2SO_4$ in an amount at least sufficient to react with all the uranium in the waste together with sufficient manganese dioxide to convert all tetravalent uranium to hexavalent uranium, heating said mixture at a temperature within the range of 85–100° C. to form soluble uranyl sulfate, $UO_2SO_4$, separating the insoluble materials from the solution containing dissolved uranyl sulfate, adding ferrous sulfate to the solution containing dissolved uranyl sulfate in an amount equal to at least 2 mols of ferrous sulfate per mol of uranyl sulfate, adding to the solution containing dissolved uranyl sulfate, hydrofluoric acid in an amount at least 150% in excess of that required to react with the uranyl sulfate, maintaining the mixture of uranyl sulfate, ferrous sulfate and hydrofluoric acid at a temperature between 85–100° C. to precipitate uranium tetrafluoride hydrate, separating the uranium tetrafluoride hydrate precipitate from the reaction mixture, drying the uranium tetrafluoride hydrate under an atmosphere of gaseous hydrogen fluoride and a temperature of about 150° C. and converting the dried uranium tetrafluoride hydrate to anhydrous uranium tetrafluoride by heating at a temperature within the range of 475–525° C. under an atmosphere of gaseous hydrogen fluoride.

References Cited by the Examiner

UNITED STATES PATENTS

| | | | |
|---|---|---|---|
| 2,738,253 | 3/56 | Thunaes et al. | 23—14.5 |
| 2,780,519 | 2/57 | Kaufman et al. | 23—14.5 |
| 2,815,261 | 12/57 | Thunaes et al. | 23—14.5 |
| 2,859,092 | 11/58 | Bailes et al. | 23—14.5 |
| 2,859,156 | 11/58 | Allen et al. | 23—14.5 |
| 2,866,680 | 12/58 | Long | 23—14.5 |

FOREIGN PATENTS

| | | |
|---|---|---|
| 1,157,268 | 12/57 | France. |
| 821,957 | 10/59 | Great Britain. |

CARL D. QUARFORTH, *Primary Examiner.*

ROGER L. CAMPBELL, *Examiner.*